United States Patent
Giura et al.

(10) Patent No.: US 10,530,808 B2
(45) Date of Patent: *Jan. 7, 2020

(54) NETWORK PROTECTION FROM CYBER ATTACKS

(71) Applicant: AT&T Intellectual Property I, L.P., Atlanta, GA (US)

(72) Inventors: Paul Giura, Cairo, NY (US); Jeffrey E. Bickford, Somerset, NJ (US); Gustavo de los Reyes, Fair Haven, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/996,280

(22) Filed: Jan. 15, 2016

(65) Prior Publication Data

US 2016/0134643 A1    May 12, 2016

Related U.S. Application Data

(63) Continuation of application No. 14/090,034, filed on Nov. 26, 2013, now Pat. No. 9,258,324.

(51) Int. Cl.
*H04L 29/06* (2006.01)
*H04L 12/58* (2006.01)
*H04L 29/08* (2006.01)

(52) U.S. Cl.
CPC ............ *H04L 63/145* (2013.01); *H04L 51/12* (2013.01); *H04L 63/1441* (2013.01); *H04L 63/1483* (2013.01); *H04L 67/2814* (2013.01)

(58) Field of Classification Search
CPC ............ H04L 63/1416; H04L 63/1408; H04L 63/145; H04L 63/1441

See application file for complete search history.

(56) References Cited

U.S. PATENT DOCUMENTS

| | | | |
|---|---|---|---|
| 836,286 A | 11/1906 | Thomas | |
| 5,961,582 A | 10/1999 | Gaines | |
| 6,233,618 B1 * | 5/2001 | Shannon | G06F 17/30887 707/999.01 |
| 6,792,461 B1 * | 9/2004 | Hericourt | H04L 29/06 370/230 |
| 7,756,929 B1 | 7/2010 | Pettigrew et al. | |
| 7,765,483 B2 | 7/2010 | Schmieder et al. | |
| 7,836,303 B2 | 11/2010 | Levy et al. | |

(Continued)

FOREIGN PATENT DOCUMENTS

| WO | WO 2012109633 | 8/2012 |
|---|---|---|
| WO | WO 2013067505 | 5/2013 |
| WO | WO 2013067508 | 5/2013 |

OTHER PUBLICATIONS

Srivastava et al., "Trusted VM Snapshots in Untrusted Cloud Infrastructures," AT&T Lab Research, Microsoft Research, School of Computer Science, Georgia Institute of Technology, 20 pages.

*Primary Examiner* — Ali S Abyaneh
(74) *Attorney, Agent, or Firm* — Scott P. Zimmerman, PLLC

(57) ABSTRACT

Electronic screen shots protect against cyber attacks. When any webpage is received, a screen shot of the webpage may be generated. Should the webpage be from an untrusted source, the screen shot protects downstream resources and clients from potential malware contained within the webpage.

18 Claims, 8 Drawing Sheets

(56) References Cited

U.S. PATENT DOCUMENTS

| | | | |
|---|---|---|---|
| 7,904,951 B1* | 3/2011 | Ebrahimi | H04L 63/0823 |
| | | | 713/153 |
| 8,359,223 B2 | 1/2013 | Chi et al. | |
| 8,479,194 B2 | 7/2013 | Rangegowda et al. | |
| 8,543,726 B1* | 9/2013 | Kann | H04L 63/0281 |
| | | | 709/219 |
| 2003/0023471 A1 | 1/2003 | Kettler, III et al. | |
| 2003/0216957 A1 | 11/2003 | Florence et al. | |
| 2008/0229427 A1* | 9/2008 | Ramirez | G06F 21/566 |
| | | | 726/26 |
| 2008/0256538 A1 | 10/2008 | Carter et al. | |
| 2010/0064230 A1 | 3/2010 | Klawitter et al. | |
| 2011/0113467 A1 | 5/2011 | Agarwal et al. | |
| 2012/0079596 A1 | 3/2012 | Thomas et al. | |
| 2012/0084713 A1* | 4/2012 | Desai | G06F 3/0481 |
| | | | 715/788 |
| 2012/0144489 A1 | 6/2012 | Jarrett et al. | |
| 2012/0167231 A1* | 6/2012 | Garcia | G06F 21/6218 |
| | | | 726/27 |
| 2012/0240224 A1 | 9/2012 | Payne et al. | |
| 2013/0024940 A1 | 1/2013 | Hutchins et al. | |
| 2013/0047154 A1 | 2/2013 | Mehta | |
| 2013/0055256 A1 | 2/2013 | Banga et al. | |
| 2013/0055396 A1 | 2/2013 | Wang et al. | |
| 2013/0117849 A1 | 5/2013 | Golshan et al. | |
| 2013/0117852 A1 | 5/2013 | Stute | |
| 2014/0115669 A1* | 4/2014 | Teodoro | H04L 63/1458 |
| | | | 726/4 |
| 2014/0136944 A1 | 5/2014 | Harris et al. | |

\* cited by examiner

NETWORK PROTECTION FROM CYBER ATTACKS

CROSS-REFERENCE TO RELATED APPLICATION

This application is a continuation of U.S. application Ser. No. 14/090,034 filed Nov. 26, 2013 and since issued as U.S. Pat. No. 9,258,324, which is incorporated herein by reference in its entirety.

BACKGROUND

The present disclosure relates generally to computer system and network security and, more particularly, to methods, systems, computer program products for protecting a communication network against Advanced Persistent Threats (APTs) by controlling the vectors of potential data exfiltration.

Advanced Persistent Threats (APTs) are one of the fastest growing information security threats that organizations face today. The goals of an APT are typically to steal intellectual property (IP), generated from expensive research, from a targeted organization, to gain access to sensitive customer data, and/or to access strategic business information that could be used for financial gain, blackmail, embarrassment, data poisoning, illegal insider trading and/or to disrupt an organization's business. APTs have become very sophisticated and diverse in the methods and technologies used, particularly in the ability to use an organization's own employees to penetrate the information technology (IT) systems by using social engineering methods. APTs may trick users into opening spear phishing emails, which install specially crafted and customized malware that may contain code to exploit zero-day vulnerabilities in the targeted system. FIG. 1 shows the typical attack infrastructure and how the APT operators carry out most APTs. First, an APT operator, from, for example, an overseas network, launches an attack campaign to compromise public vulnerable servers 150a, 150b, and 150c. Then, the APT operator manually crafts and sends a customized spear phishing email through one or more of the compromised public servers 150a, 150b, and 150c that may contain a malicious URL or attachment that, once clicked, will install a Remote Access Trojan (RAT) on a target device, such as device 160. From this point forward, the attackers have full access to the victim device 160 and to all the data the victim can access. Usually, over a long period of time, the APT operators will manually execute commands, such as command and control (C&C) commands, and will move laterally into the victim's network, compromising other internal resources, such as internal server 165, until they reach the targeted internal resources or data. The data may then be exfiltrated back through the compromised servers 150a, 150b, and 150c and made available to the APT operator.

APT protection effort has focused on stopping malware from entering the enterprise perimeter. A potential problem with this approach is that there may be too many vectors of infection (e.g. email attachments, malicious URLs, USB drives, etc.) and in most cases APT operators use zero day exploits that are not detectable by traditional perimeter based systems. Moreover, once a device is compromised and the APT operators have a foothold in the organization network, there are too many possible outgoing vectors for data exfiltration (e.g. email, raw IP connections, USB drives, etc.). The same problems may persist when the enterprise is moved into the cloud and virtualized apps or desktops are used to access corporate data.

Cloud computing is a computing paradigm where shared resources, such as processor(s), software, and information, are provided to computers and other devices on demand typically over a network, such as the Internet. In a cloud computing environment, details of the computing infrastructure, e.g., processing power, data storage, bandwidth, and/or other resources are abstracted from the user. The user does not need to have any expertise in or control over such computing infrastructure resources. Cloud computing typically involves the provision of dynamically scalable and/or virtualized resources over the Internet. A user may access and use such resources through the use of a Web browser. A typical cloud computing provider may provide an online application that can be accessed over the Internet using a browser. The cloud computing provider, however, maintains the software for the application and some or all of the data associated with the application on servers in the cloud, i.e., servers that are maintained by the cloud computing provider rather than the users of the application.

FIG. 2 illustrates a conventional cloud service model that includes Infrastructure as a Service (IaaS), Platform as a Service (PaaS), and Software as a Service (SaaS). Infrastructure as a Service, delivers computer infrastructure—typically a platform virtualization environment—as a service. Rather than purchasing servers, software, data-center space or network equipment, clients instead buy those resources as a fully outsourced service. Suppliers typically bill such services on a utility computing basis and the amount of resources consumed. Platform as a Service delivers a computing platform as a service. It provides an environment for the deployment of applications without the need for a client to buy and manage the underlying hardware and software layers. Software as a Service delivers software services over the Internet, which reduces or eliminates the need for the client to install and run an application on its own computers, which may simplify maintenance and support.

Virtualized computing environments may be used to provide computing resources to end users. In a cloud computing environment, the physical hardware configuration is hidden from the end user. Cloud computing systems may include servers, network storage devices, routers, gateways, communication links, and other devices. Because the physical hardware and software platforms on which cloud computing system is implemented are hidden within a "cloud," they can be managed, upgraded, replaced or otherwise changed by a system administrator without the customer being aware of or affected by the change.

In a typical cloud computing environment, applications may be executed on virtual machines, which are isolated guest operating systems installed within a host system. Virtual machines are typically implemented with either software emulation or hardware virtualization, or both. A single hardware and/or software platform may host a number of virtual machines, each of which may have access to some portion of the platform's resources, such as processing resources, storage resources, etc.

FIG. 3 illustrates a server system 100 for a virtualized computing environment in which the inventive subject matter of the present disclosure can function. The server system 100 generally hosts one or more virtual machines 104 (hereafter virtual machine 104), each of which runs a guest operating system 106 and application 108. The computing needs of users 102 drive the functionality of the virtual machines 104. A virtual hypervisor 110 provides an interface between the virtual machines 104 and a host operating system 112 and allows multiple guest operating systems 106 and associated applications 108 to run concurrently. The host operating system 112 handles the operations of a hardware platform 114 capable of implementing virtual machines 104. A data storage space 116 may be accessed by the host operating system 112 and is connected to the hardware platform 114.

The hardware platform 114 generally refers to any computing system capable of implementing virtual machines 104, which may include, without limitation, a mainframe, personal computer (PC), micro-computer, handheld computer, mobile computing platform, server, or any other appropriate computer hardware. The hardware platform 114 may include computing resources, such as a central processing unit (CPU); networking controllers; communication controllers; a display unit; a program and data storage device; memory controllers; input devices (e.g., a keyboard, a mouse, etc.) and output devices, such as printers. The CPU may be any conventional processor, such as the AMD Athlon™ 64, or Intel® Core™ Duo.

The hardware platform 114 may be further connected to the data storage space 116 through serial or parallel connections. The data storage space 116 may be any suitable device capable of storing computer-readable data and instructions, and it may include logic in the form of software applications, random access memory (RAM), or read only memory (ROM), removable media, or any other suitable memory component. According to the illustrated embodiment, the host operating system 112 stands between the hardware platform 114 and the users 102 and is responsible for the management and coordination of activities and the sharing of the computing resources. In other embodiments, the virtual hypervisor runs directly on the hardware 114 without the intervening host operating system 112.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the server 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 creates an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) runs on the host operating system 112 and provides an interface between the virtual machines 104 and the hardware platform 114 through the host operating system 112. The virtual hypervisor 110 virtualizes the computing system resources and facilitates the operation of the virtual machines 104. The hypervisor 110 may provide the illusion of operating at the highest priority level to the guest operating systems 106. The virtual hypervisor 110 maps the guest operating system's priority level to a priority level lower than the top most priority level. As a result, the virtual hypervisor 110 can intercept the guest operating system 106 to execute instructions that require virtualization assistance. Alternatively, the virtual hypervisor 110 may emulate or actually execute the instructions on behalf of the guest operating system 106. Software operations permitting indirect interaction between the guest operating system 106 and the physical hardware platform 114 are also performed by the virtual hypervisor 110.

Virtual machines 104 present a virtualized environment to guest operating systems 106, which in turn provide an operating environment for applications 108 and other software constructs.

Referring to FIG. 4, a virtualized computing environment 200 (referred to generally as cloud 200) may include one or more server systems 100 that may include one or more electronic computing devices operable to receive, transmit, process, and store data. For example, the servers in the cloud 200 may include one or more general-purpose PCs, Macintoshes, micro-computers, workstations, Unix-based computers, server computers, one or more server pools, or any other suitable devices. In certain embodiments, the cloud 200 may include a web server. In short, the cloud 200 may include any suitable combination of software, firmware, and hardware.

The cloud 200 may include a plurality of server systems 100 that are communicatively coupled via a network 112. The network 112 facilitates wireless or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANS), wide area networks (WANs), all or a portion of the global computer network known as the Internet, and/or any other communication system or systems at one or more locations. Although referred to herein as "server systems," it will be appreciated that any suitable computing device may be used.

Virtual machines and/or other objects in a virtualization environment can be grouped into logical clusters for management and/or operational purposes. For example, virtual machines can be grouped into clusters based on load balancing needs, security needs, redundancy needs, or any other needs as determined by a system administrator. The virtual machines grouped within a cluster may or may not all be implemented on a single physical server. Any desired number of clusters can be defined subject to system limitations, and each of the clusters can include any desired number of virtual machines subject to server limitations.

Virtual machines can be deployed in particular virtualization environments and organized to increase the efficiency of operating and/or managing a virtual computing environment. For example, virtual machines may be grouped into clusters to provide load balancing across multiple servers.

Virtual machines within a same cluster can be managed by a single virtualization environment manager to have same or similar resource access privileges (e.g., processor utilization, priority, memory allocation, communication interface access privileges, etc.), while virtual machines within different clusters can have different resource access privileges.

Virtual machines that are deployed within a single cluster may share physical resources within a server. For example, virtual machines that are deployed within a single cluster may share physical memory, storage, communication facilities and other resources or services of a server. Whenever computing resources are shared, there is the possibility that one virtual machine could intentionally or unintentionally gain access to data of another virtual machine.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments provide a method comprising receiving from a client device at a client interface application a request to access an application, the client interface application being accessible to the client device, determining whether the application is external to a communication network, redirecting the request to an external communication server when the application is external to the communication network, sending the request from the external communication server to the application that is external to the communication network, receiving information from the application that is external to the communication network at the external communication server responsive to sending the request, and replicating a screen of the external communication server containing the information received from the application for display at the client interface application.

In other embodiments, the client interface application is a Web browser application and the request is a Hypertext Transfer Protocol based request.

In still other embodiments, replicating the screen of the external communication server comprises replicating the screen of the external communication server using Remote Desktop Protocol.

In still other embodiments, the method further comprises redirecting the request to an internal server on which the application resides when the application is internal to the communication network.

In still other embodiments, the method further comprises receiving information from the application that is internal to the communication network at the client interface application responsive to the internal server receiving the request.

In still other embodiments, the method further comprises receiving from the client device at an electronic mail application an electronic mail request, forwarding the electronic mail request to an internal electronic mail server that is internal to the communication network, determining at the internal electronic mail server whether the electronic mail request is directed to an external electronic mail server that is external to the communication network, determining whether the electronic mail request violates an electronic mail policy when the electronic mail request is directed to the external electronic mail server, and blocking the electronic mail request at the internal electronic mail server when the electronic mail request violates the electronic mail policy.

In still other embodiments, the client interface application is provided through a hosted virtual desktop environment.

In further embodiments, a system comprises a processor and a memory that is coupled to the processor. The memory comprises computer readable program code that when executed by the processor causes the processor to perform operations comprising receiving from a client device at a client interface application a request to access an application, the client interface application being accessible to the client device, determining whether the application is external to a communication network, redirecting the request to an external communication server when the application is external to the communication network, sending the request from the external communication server to the application that is external to the communication network, receiving information from the application that is external to the communication network at the external communication server responsive to sending the request, and replicating a screen of the external communication server containing the information received from the application for display at the client interface application.

In still further embodiments, the client interface application is a Web browser application and the request is a Hypertext Transfer Protocol based request.

In still further embodiments, replicating the screen of the external communication server comprises replicating the screen of the external communication server using Remote Desktop Protocol.

In still further embodiments, the operations further comprise redirecting the request to an internal server on which the application resides when the application is internal to the communication network.

In still further embodiments, the operations further comprise receiving information from the application that is internal to the communication network at the client interface application responsive to the internal server receiving the request.

In still further embodiments, the operations further comprise receiving from the client device at an electronic mail application an electronic mail request, forwarding the electronic mail request to an internal electronic mail server that is internal to the communication network, determining at the internal electronic mail server whether the electronic mail request is directed to an external electronic mail server that is external to the communication network, determining whether the electronic mail request violates an electronic mail policy when the electronic mail request is directed to the external electronic mail server, and blocking the electronic mail request at the internal electronic mail server when the electronic mail request violates the electronic mail policy.

In still further embodiments, the client interface application is provided through a hosted virtual desktop environment.

In other embodiments, a computer program product comprises a tangible computer readable medium comprising computer readable program code embodied in the medium that when executed by a processor causes the processor to perform operations comprising receiving from a client device at a client interface application a request to access an application, the client interface application being accessible to the client device, determining whether the application is external to a communication network, redirecting the request to an external communication server when the application is external to the communication network, sending the request from the external communication server to the application that is external to the communication network, receiving information from the application that is external to the communication network at the external communication server responsive to sending the request, and replicating a screen of the external communication server containing the information received from the application for display at the client interface application.

In still other embodiments, the client interface application is a Web browser application and the request is a Hypertext Transfer Protocol based request.

In still other embodiments, replicating the screen of the external communication server comprises replicating the screen of the external communication server using Remote Desktop Protocol.

In still other embodiments, the operations further comprise redirecting the request to an internal server on which the application resides when the application is internal to the communication network.

In still other embodiments, the operations further comprise receiving information from the application that is internal to the communication network at the client interface application responsive to the internal server receiving the request.

In still other embodiments, the operations further comprise receiving from the client device at an electronic mail application an electronic mail request, forwarding the electronic mail request to an internal electronic mail server that is internal to the communication network, determining at the internal electronic mail server whether the electronic mail request is directed to an external electronic mail server that is external to the communication network, determining whether the electronic mail request violates an electronic mail policy when the electronic mail request is directed to the external electronic mail server, and blocking the electronic mail request at the internal electronic mail server when the electronic mail request violates the electronic mail policy.

Other methods, systems, articles of manufacture, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

Figure 1:
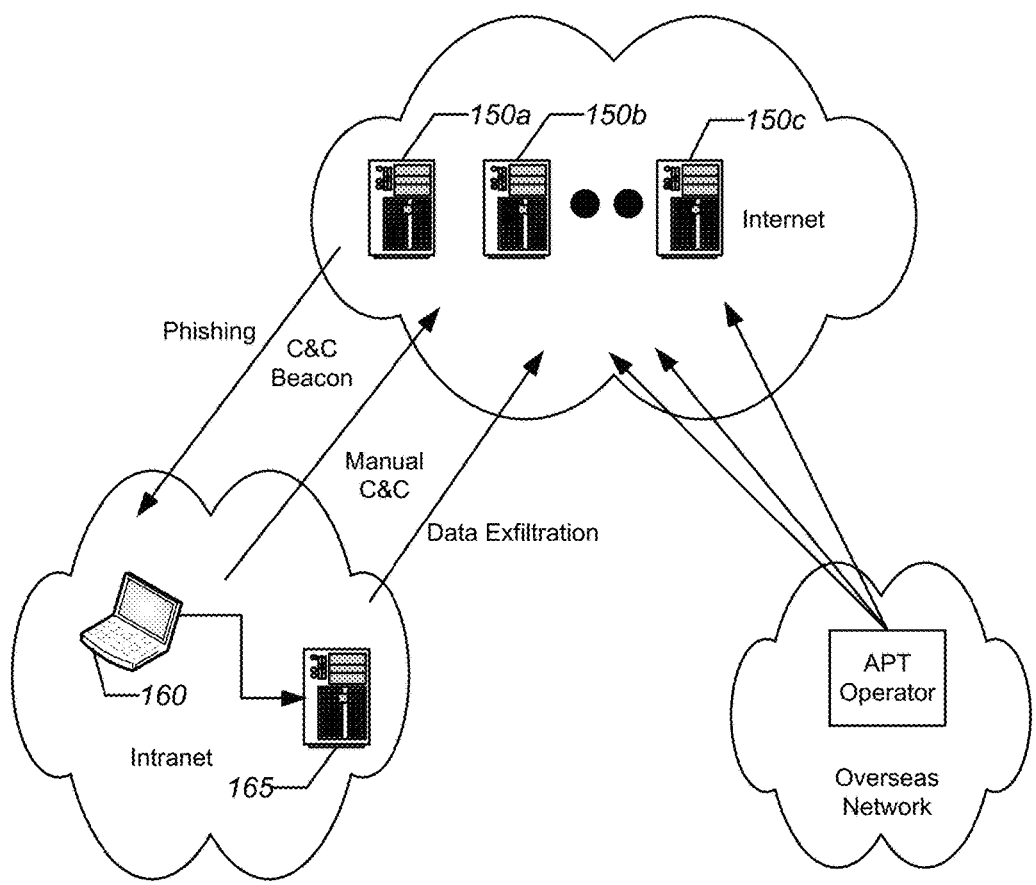
FIG. 1 is a block diagram of a communication network that illustrates a typical attack infrastructure for an Advanced Persistent Threat (APT) operator.
Figure 2:
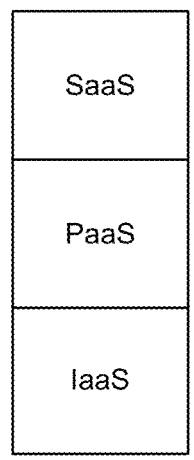
FIG. 2 is a block diagram that illustrates cloud computing paradigm.
Figure 3:
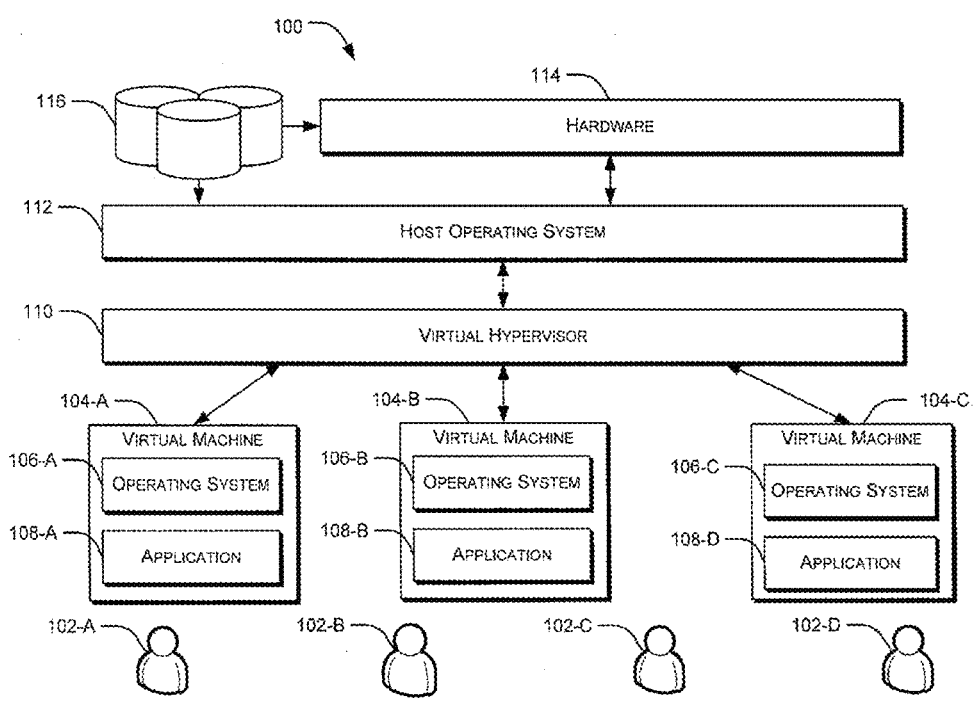
FIG. 3 is a block diagram that illustrates a virtualized computing environment.
Figure 4:
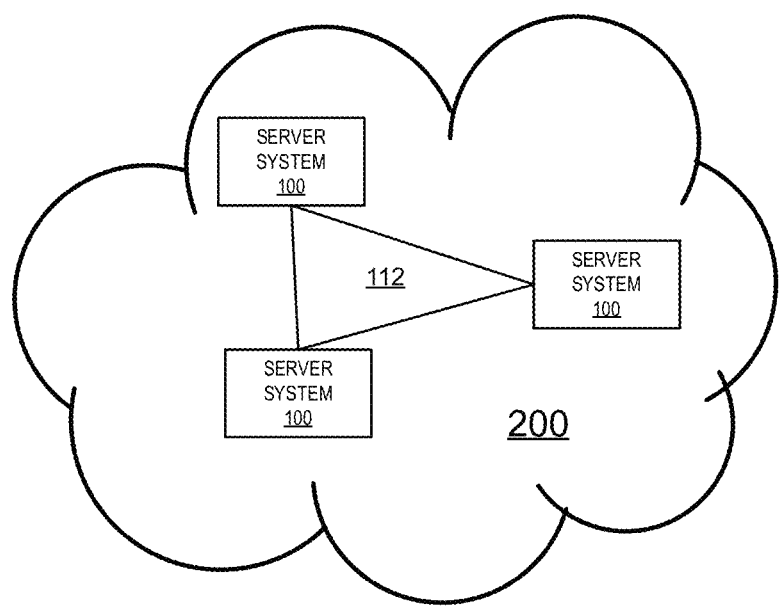
FIG. 4 is a block diagram that illustrates a cloud computing environment.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Some embodiments stem from a realization that a communication network, such as an enterprise network, can be configured to separate corporate resources and data from outbound access to an external network, such as the Internet, and allow external network access only through a limited number of controlled paths. For example, when a user wishes to access the Internet the user may use a dedicated and controlled path to a web browser that runs in an external communication server, which may be a separate virtual machine. Therefore no raw external Internet Protocol (IP) connections to the Internet may be allowed from the environment where the enterprise data is located. Client devices may have access to client interface applications (e.g., virtualized desktop) using some type of network (e.g., mobility, Wi-Fi, or wired broadband) over a screen replication protocol, such as Remote Desktop Protocol (RDP). The screen replication protocol is used to ensure only screenshots are sent back from the external communication server to other servers in the enterprise network and from the client interface applications to the client devices, which also may be untrusted. Thus, while the external communication server may be vulnerable to an Advanced Persistent Threat (APT) attack, the intrusion can be confined to the external communication as screen replication is used between the external communication server and other servers and systems in the enterprise network. Moreover, the external communication server can be re-started with a fresh-image frequently to remove persistent malware.

Figure 5:
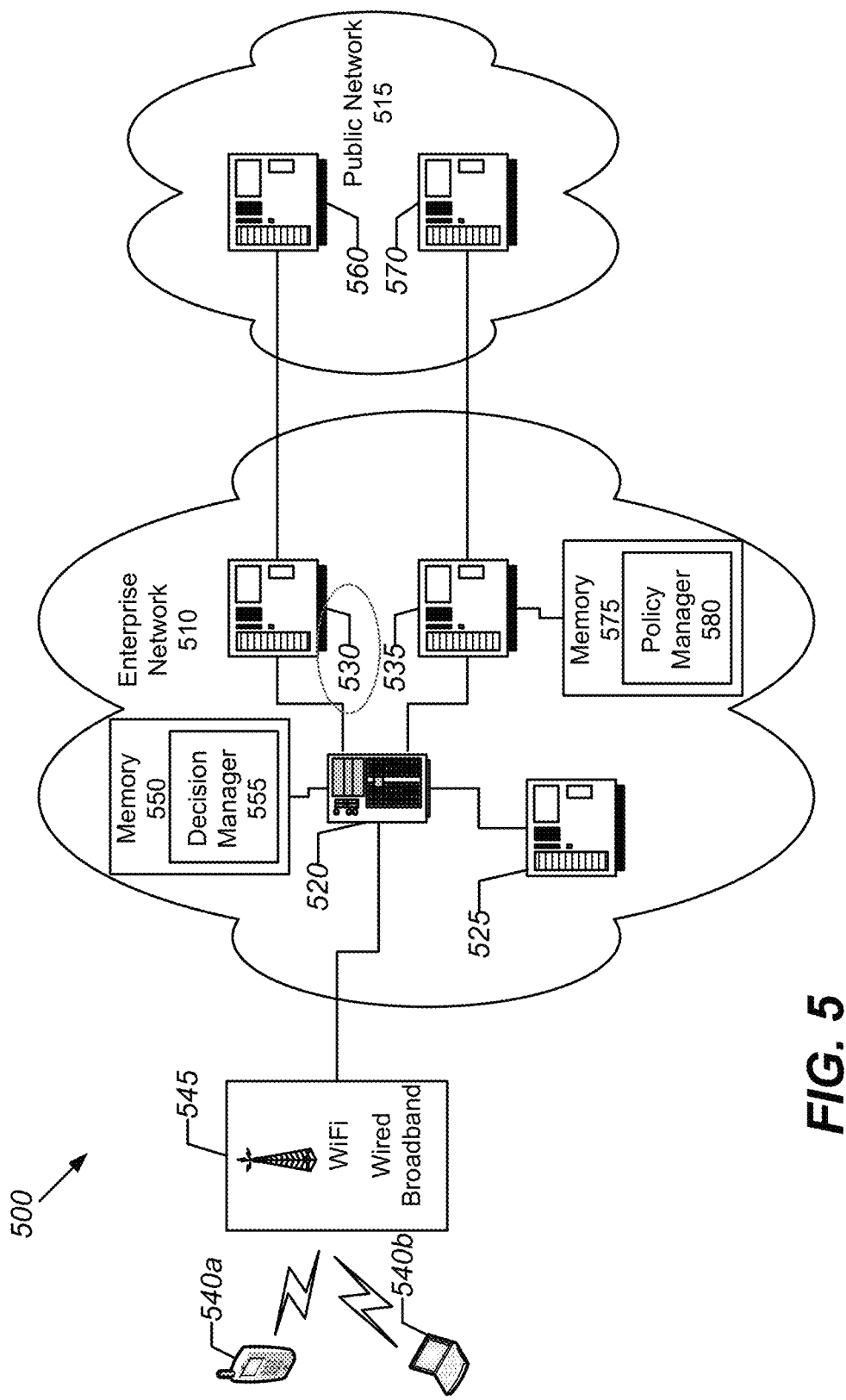
FIG. 5 is a block diagram of a communication network in which screen replication from controlled public network access points is used to reduce the effects of Internet enabled cyber attacks according to some embodiments.

Referring now to FIG. 5, a communication network 500 includes both an enterprise network 510 and a public network 515. The public network 515 may represent a global network, such as the Internet, or other publicly accessible network. Furthermore, the public network 515 may represent a combination of public and private networks or a virtual private network (VPN). The enterprise network 510 may represent a wide area network, a local area network, an Intranet, or other private network, which may not accessible by the general public. The enterprise network 510 includes a client interface server 520, an internal resource server 525, an external communication server 530, and an electronic mail server 535 that are connected as shown. Each of the client interface server 520, the internal resource server 525, the external communication server 530, and the electronic mail server 535 may be implemented as a single server, separate servers, or a network of servers either co-located in a server farm, for example, or located in different geographic regions. In some embodiments, these servers may be implemented as virtual servers on a single hardware platform.

The communication network 500 further comprises mobile devices 540a and 540b that communicate with the client interface server 520 in the enterprise network 510 over a variety of types of networks 545 including, but not limited to, cellular, WiFi, and wired broadband. It will be further understood that client devices may also communicate with the client interface server 520 through wired connections.

The client interface server 520 may support one or more virtualized client interface applications, for example, that may service requests from client devices 540a and 540b. The client interface server 520 is equipped with a memory 550 that is representative of the one or more memory devices containing the software and data used to decide whether to rout client requests for an application to an internal enterprise network 510 resource or to an application that is external to the enterprise network 510. As shown in FIG. 5, the memory 550 may contain a decision manager module 555 that may be used to evaluate requests received from client devices, such as client devices 540a and 540b, and determine whether the requests are for applications or resources internal to the enterprise network 510—in which case the request may be routed to the internal resource server 525—or if the requests are for applications or resources external to the enterprise network 510—in which case the request may be routed to the external communication server 530. The virtualized client interface application(s) may route electronic mail requests to the electronic mail server 535.

The external communication server 530 may be configured as a virtual server that handles requests for applications external to the enterprise network 510. For example, if a client device uses a Web browser application to generate a Hypertext Transfer Protocol based request to access an external website, the external communication server 530 may communicate with the external server 560 in the public network 515 to access the website. Because the external server 560 is in public network 515 and is vulnerable to APT attacks as described above, the external communication server 530 may provide the obtained website information back to the client device using screen replication, such as that provided through RDP. Because only screen shots are sent back to the client device, an APT operator can only penetrate the external communication server 530 in the enterprise network 510 thereby protecting other servers and resources in the enterprise network 510.

The electronic mail server 535 may be configured to handle electronic mail requests from client devices, such as client devices 540a and 540b. The electronic mail requests may be serviced internal to the enterprise network 510 at the electronic mail server 535 or the requests may involve the electronic mail server 535 communicating with an external electronic mail server 570 that is located in the public network 515. The electronic mail server 575 is equipped with a memory 575 that is representative of the one or more memory devices containing the software and data used to apply policies or rules defined, for example, by the operator of the enterprise network 510 for managing, sending, and/or receiving email in the enterprise. As shown in FIG. 5, the memory 575 may contain a policy manager module 580 that may evaluate electronic mail requests and determine whether the electronic mail requests violate the policies or rules defined by the enterprise. For example, the policy manager module 580 may block an electronic mail request that seeks to download an electronic mail message from the external electronic mail server 570 to the electronic mail server 535 that contains an attachment that is a virus or some other type of malware. By using the policy manager 580 to manage access to the external electronic mail server 570, the risk of a successful attack from an APT operator or other hostile party on the enterprise through the email system can be reduced.

Although FIG. 5 illustrates an exemplary communication network and an exemplary hardware/software architecture that may be used in data processing systems, such as the client interface server 520 and the electronic mail server 535 for protecting an enterprise network against attacks by APT operators or other hostile parties, it will be understood that embodiments of the present invention are not limited to such a configuration but are intended to encompass any configuration capable of carrying out operations as described herein. Moreover, the functionality of the client interface server 520 and the electronic mail server 535 of FIG. 5 may be implemented as a single processor system, a multi-processor system, a multi-core processor system, or even a network of stand-alone computer systems, in accordance with various embodiments.

Computer program code for carrying out operations of data processing systems and servers described above with respect to FIG. 5, such as the anomaly detection server 160, may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

Figure 6:
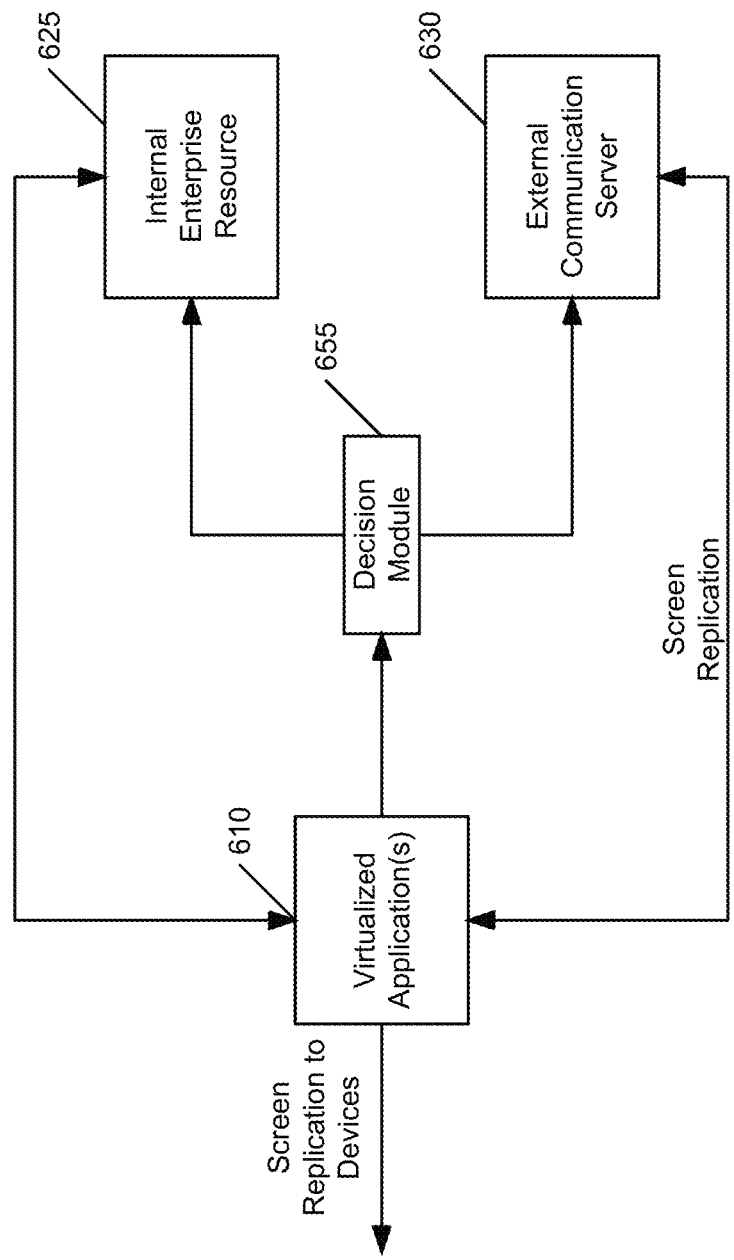
FIG. 6 is a block diagram that illustrates the architecture of the client interface server, the internal resource server, and the external communication server according to some embodiments.

FIG. 6 is a block diagram that further illustrates the architecture of the client interface server 520, internal resource server 525, and external communication server 530 according to some embodiments. As shown in FIG. 6, virtualized applications 610, which may be embodied as a hosted virtualized desktop, may reside on the client interface server 520 and may provide a portal to the enterprise network for client devices. Requests from the client devices are processed by the decision manager module 655, which corresponds to the decision manager module 555 of FIG. 5, to determine if the request is for access to an application or resource internal to the enterprise network or external to the enterprise network. If the request is for an application or resource internal to the enterprise network, then the request is forwarded to the internal enterprise resource server 625, which corresponds to the internal resource server 525 of FIG. 5, for processing. The virtualized applications 610 may exchange data with applications and other resources on the internal resource server 625. A screen replication protocol, such as RDP, may be used, however, to communicate data from the virtualized applications back to the client devices as the client devices may be untrusted entities and the enterprise may not wish for its actual data to be stored on mobile devices. If the request is for an application or resource that is external to the enterprise network, then the request is forwarded to the external communication server 630, which corresponds to the external communication server 530 of FIG. 5. The external communication server 630 communicates with an external server in a public network, such as the Internet, to obtain data, such as Web browser data, to service the request. The external communication server 630 uses a screen replication protocol, such as RDP, to provide the data obtained in the public network back to the virtualized applications 610. As a result, if the data obtained from the public network contains a virus or other type of malware, the virus/malware is not allowed to penetrate farther into the enterprise network beyond the external communication server 630.

Exemplary embodiments are described herein with reference to flowchart and/or block diagram illustrations of methods, systems, and computer program products in accordance with some embodiments. These flowchart and/or block diagrams further illustrate exemplary operations for protecting an enterprise network against attacks by APT operators or other hostile parties, in accordance with some embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 7:
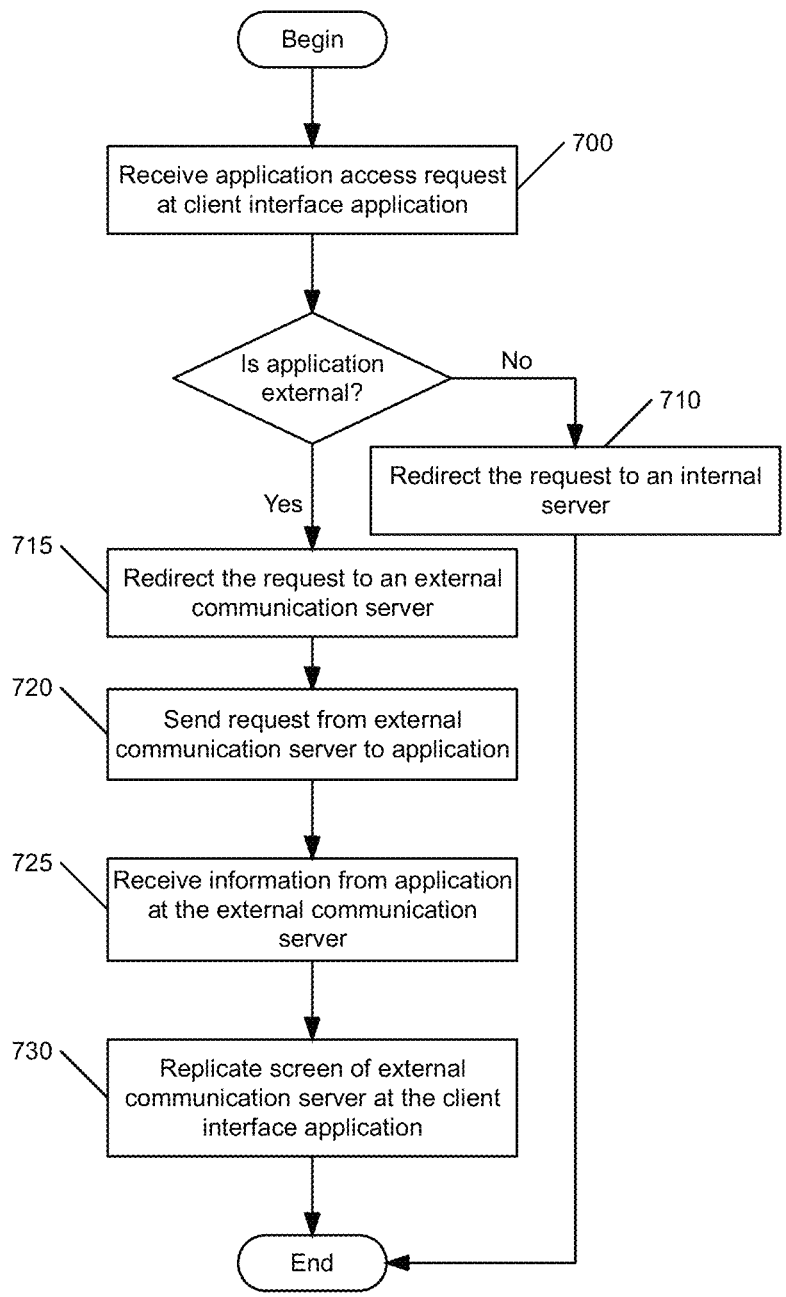
FIGS. 7 and 8 are flowcharts that illustrate operations for reducing the effects of Internet enabled cyber attacks according to some embodiments.

Referring now to FIGS. 5 and 7, exemplary operations for protecting an enterprise network against attacks by APT operators or other hostile parties begin at block 700 where the client interface server 520 receives an application access request at a client interface application, which may be provided as part of a hosted virtualized desktop environment in some embodiments. The decision manager module 555 determines at block 705 whether the request involves access to an application or resource external to the enterprise network 510, such as, for example, a Web server in the public network 515. If the request does not involve access to an application or resource external to the enterprise network 510, then the request is re-directed to the internal resource server 525 for processing at block 710.

If, however, the request does involve access to an application or resource external to the enterprise network 510, then the request is re-directed to the external communication server 530 at block 715, which then sends the request to the external server 560 in the public network 515 for processing at block 720. Information from the application in the external server 560 is received back at the external communication server 530 at block 725. Because the information received from the external server 560 in the public network 515 is susceptible to containing a virus or other type of malware generated, for example, by an APT operator, a screen replication protocol, such as RDP, may be used to provide the information back to the client device through the client interface application in the client interface server 520 at block 730. Although the external communication server 530 may become infected with malware from a hostile party, the malware is confined to the external communication server 530 and not allowed to penetrate further into the enterprise network 510. Moreover, the external communication server 530 may be frequently re-imaged to viruses and malware acquired from the public network 115.

Figure 8:
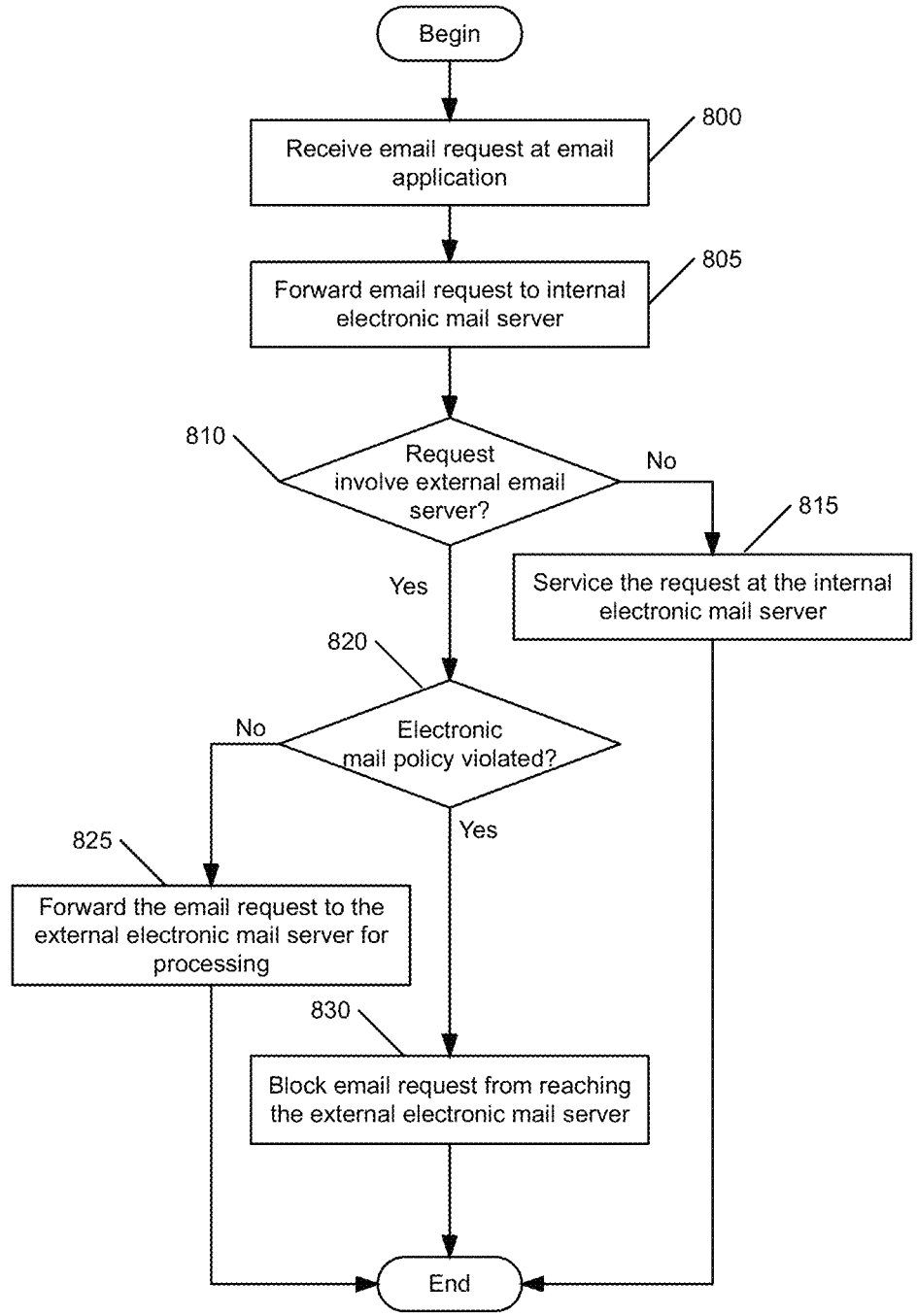

Referring now to FIGS. 5 and 8, exemplary operations for protecting an enterprise network against attacks by APT operator or other hostile parties through electronic mail begin at block 800 where the client interface server 520 receives a request to access an electronic mail interface application, which may be provided as part of a hosted virtualized desktop environment in some embodiments. The request is forwarded to the electronic mail server 535 at block 805 for processing. The electronic mail server 805 determines at block 810 whether the request involves access to the external electronic mail server 570 in the public network 515. If the request does not involve access to the external electronic mail server 570, then the electronic mail request is processed at the electronic mail server 535 at block 815.

If, however, the electronic mail request does involve access to the external electronic mail server 570, then the policy manager module 580 determines at block 820 whether the electronic mail request violates any policies or rules that the enterprise has defined for their electronic mail service. If the request does not violate any policies or rules, then the email request is forwarded from the electronic mail server 535 to the external electronic mail server 570 for processing at block 825. If, however, the request does violate one or more policies or rules, then the email request is blocked at the electronic mail server 535 from reaching the external electronic mail server 570 at block 830. An enterprise may use the policies and rules to carefully monitor what email is brought into the enterprise from the public network 515 and also what data and information is sent out from the enterprise into the public network. Thus, if an APT or hostile party were able to infect the enterprise network with a virus that collects confidential information and then emails the confidential information out of the enterprise, then the policies and rules enforced by the policy manager 580 may be able to block the sending of the confidential information at the electronic mail server 535, which is internal to the enterprise.

The flowcharts of FIGS. 7 and 8 illustrate the architecture, functionality, and operations of some embodiments of methods, systems, and computer program products for protecting an enterprise network against attacks by APT operators or other hostile parties. In this regard, each block represents a module, segment, or portion of code, which comprises one or more executable instructions for implementing the specified logical function(s). It should also be noted that in other implementations, the function(s) noted in the blocks may occur out of the order noted in FIGS. 7 and 8. For example, two blocks shown in succession may, in fact, be executed substantially concurrently or the blocks may sometimes be executed in the reverse order, depending on the functionality involved.

According to some embodiments described above, an enterprise may not allow arbitrary connections, such as IP connections, from its internal network to an external network where sensitive or protected data may be accessed by a potentially hostile party. A screen replication protocol, such as RDP, may be used to provide access to data and/or information that is obtained from an external source to prevent the spread of any intrusion from moving beyond an external communication server into other servers and resources in the enterprise network.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items. Like reference numbers signify like elements throughout the description of the figures.

Many variations and modifications can be made to the embodiments without substantially departing from the principles of the present invention. All such variations and modifications are intended to be included herein within the scope of the present invention, as set forth in the following claims.

The invention claimed is:

1. A method, comprising:

receiving, by a server, a request for a webpage sent via a private network from a remote client device, the request for the webpage associated with a network address;

determining, by the server, an internal decision based on whether the network address is internal or external to the private network;

in response to the network address being internal to the private network, then redirecting, by the server, the request for the webpage within only the private network for a retrieval of the webpage;

in response to the network address being external to the private network, then determining, by the server, an external decision;

in response to the external decision, redirecting, by the server, within only the private network, the request for the webpage to an external communications server operating in the private network, the external communications server designated for retrieving webpages from the public Internet;

receiving, by the external communications server, the webpage sourced external from the public Internet;

generating, by the external communications server, an electronic screen shot of the webpage sourced external from the public Internet;

confining, by the external communications server, a malware in the webpage sourced external retrieved from the public Internet in response to the generating of electronic screen shot of the webpage; and forwarding the electronic screen shot of the webpage via only the private network to the remote client device in response to the request for the webpage.

2. The method of claim 1, further comprising executing a screen replication protocol that generates the electronic screen shot of the webpage.

3. The method of claim 1, further comprising executing a screen replication protocol that only generates the electronic screen shot of the webpage.

4. The method of claim 1, further comprising determining an address associated with the external communications server.

5. The method of claim 1, further comprising sending the electronic screen shot to an address associated with the remote client device.

6. The method of claim 1, further comprising blocking the network address associated with the webpage.

7. A system, comprising:

a hardware processor; and a memory device, the memory device storing code, the code when executed causing the hardware processor to perform operations, the operations comprising:

receiving a request for a webpage sent via a private network from a remote client device, the webpage associated with a network address;

determining an internal decision based on the network address;

in response to the network address being within the private network, then redirecting the request for the webpage within only the private network for a retrieval of the webpage;

in response to the network address being external to the private network, then determining an external decision;

in response to the external decision, then redirecting the request for the webpage within only the private network to an external communications server that is designated for retrieving webpages from sources accessible via the public Internet;

receiving the webpage via the public Internet;

generating an electronic screen shot of the webpage received via the public Internet;

confining a malware in the webpage to the external communications server in response to the generating of the electronic screen shot, the electronic screen shot to protecting the private network from the malware in the webpage; and sending the electronic screen shot via the private network to the remote client device in response to the request for the webpage.

8. The system of claim 7, wherein the operations further comprise executing a screen replication protocol that generates the electronic screen shot of the webpage.

9. The system of claim 7, wherein the operations further comprise executing a screen replication protocol that only generates the electronic screen shot of the webpage.

10. The system of claim 7, wherein the operations further comprise determining an address associated with the generating of the electronic screen shot.

11. The system of claim 7, wherein the operations further comprise sending the electronic screen shot to an address associated with the remote client device.

12. The system of claim 7, wherein the operations further comprise blocking the network address associated with the webpage.

13. A memory device storing instructions that when executed cause a hardware processor to perform operations, the operations comprising:

receiving a request for a webpage, the request sent via a private network from a remote client device to a server, the webpage associated with a network address;

determining an internal decision by the server based on the network address;

in response to the network address being within the private network, then redirecting the request for the webpage from the server within only the private network for a retrieval of the webpage;

in response to the network address being external to the private network, then determining an external decision;

in response to the external decision, then redirecting the request for the webpage within only the private network from the server to an external communications server operating in the private network and designated for retrieving webpages from sources accessible via the public Internet;

receiving the webpage at the external communications server sourced external from the public Internet;

generating an electronic screen shot of the webpage sourced external from the public Internet by the external communications server;

confining a malware in the webpage to the external communications server in response to the generating of the electronic screen shot of the webpage sourced external from the public Internet;

sending the electronic screen shot of the webpage from the external communications server to the server via only the private network; and forwarding the electronic screen shot of the webpage from the server via only the private network to the remote client device in response to the request for the webpage.

14. The memory device of claim 13, wherein the operations further comprise executing a screen replication protocol that generates the electronic screen shot of the webpage.

15. The memory device of claim 13, wherein the operations further comprise executing a screen replication protocol that only generates the electronic screen shot of the webpage.

16. The memory device of claim 13, wherein the operations further comprise reimaging the external communications server to remove the malware.

17. The memory device of claim 13, wherein the operations further comprise determining an address associated with the external communications server.

18. The memory device of claim 13, wherein the operations further comprise blocking the network address associated with the webpage.

* * * * *